(12) United States Patent
Talebiesfandarani et al.

(10) Patent No.: US 12,388,085 B2
(45) Date of Patent: Aug. 12, 2025

(54) ELECTRODES COMPRISING BLENDED ACTIVE MATERIALS

(71) Applicant: Rivian IP Holdings, LLC, Plymouth, MI (US)

(72) Inventors: Majid Talebiesfandarani, Emeryville, CA (US); Yumi Kim, San Jose, CA (US); Liyuan Sun, Mountain View, CA (US); Sookyung Jeong, San Jose, CA (US); Soo Kim, Fremont, CA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 494 days.

(21) Appl. No.: 17/950,032

(22) Filed: Sep. 21, 2022

(65) Prior Publication Data
US 2024/0097128 A1 Mar. 21, 2024

(51) Int. Cl.
*H01M 4/58* (2010.01)
*H01M 4/36* (2006.01)
*H01M 10/0525* (2010.01)
*H01M 4/02* (2006.01)

(52) U.S. Cl.
CPC ......... *H01M 4/5825* (2013.01); *H01M 4/364* (2013.01); *H01M 10/0525* (2013.01); *H01M 2004/021* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 10,290,856 B2* | 5/2019 | Oyama | H01M 4/625 |
| 2015/0118559 A1* | 4/2015 | Ito | H01M 4/366 |
| | | | 429/221 |
| 2016/0344029 A1 | 11/2016 | Yasumiishi et al. | |
| 2021/0305618 A1* | 9/2021 | Oshitari | H01M 4/525 |

FOREIGN PATENT DOCUMENTS

| | | |
|---|---|---|
| EP | 4318672 A1 | 2/2024 |
| JP | 2013-232313 A | 11/2013 |
| JP | 2024-519752 A | 5/2024 |

OTHER PUBLICATIONS

Japanese Office Action from Japanese Patent Application No. 2023-132764, dated Oct. 1, 2024, 12 pages including machine-generated English language translation.

(Continued)

*Primary Examiner* — Wyatt P McConnell
(74) *Attorney, Agent, or Firm* — BAKERHOSTETLER

(57) ABSTRACT

Provided are electrodes for lithium-ion batteries comprising: a first lithium metal phosphate material comprising a first plurality of active material particles; and a second lithium metal phosphate material comprising a second plurality of active material particles, wherein both the first lithium metal phosphate material and the second lithium metal phosphate material are $LiMPO_4$, wherein M is one or more of iron (Fe) or manganese (Mn), and wherein the first lithium metal phosphate material is blended with the second lithium metal phosphate material at a weight ratio of greater than 1:1.

20 Claims, 19 Drawing Sheets

(56) References Cited

OTHER PUBLICATIONS

Japanese Office Action from Japanese Patent Application No. 2023-132764, dated Apr. 22, 2025, 4 pages with English language summary.
Korean Office Action from Korean Patent Application No. 10-2023-0115033, dated Jun. 16, 2025, 6 pages with English language summary.

* cited by examiner

ELECTRODES COMPRISING BLENDED ACTIVE MATERIALS

INTRODUCTION

The present disclosure generally relates to cathode active materials, and more particularly, to blending cathode active materials for lithium-ion batteries.

SUMMARY

Provided are active material blends, cathodes comprising blended active materials, lithium-ion batteries having cathodes comprising blended active materials, and electric vehicles comprising a lithium-ion battery having a cathode comprising blended active materials. Specifically, the embodiments described include blending a first lithium phosphate material comprising a first plurality of particles and a second lithium metal phosphate material comprising a second plurality of particles at a weight ratio of greater than 1:1. In some embodiments, the second plurality of particles may comprise secondary particles including aggregates of primary particles. In some embodiments, the second lithium metal phosphate material includes both secondary particles and primary particles. In some embodiments, both the first lithium metal phosphate material and the second lithium metal phosphate material include only primary particles.

Both the first and second lithium metal phosphate materials have the formula $LiMPO_4$, wherein M is one or more of manganese (Mn) or iron (Fe). In some embodiments, the first and second lithium metal materials may have different chemical formulas. In some embodiments, the chemical formula of the first and second lithium metal phosphate materials may be the same.

The active material blends described herein are formulated to achieve specific performance properties, such as high energy density, high solids, high rate performance, high power density, and/or low temperature performance. These active material blends may be used in lithium ion batteries having a cylindrical, prismatic, and/or a pouch structure. In some embodiments, the blended active materials described herein may be used to fabricate cathodes for rechargeable lithium-ion batteries for use in an electric vehicle.

In some embodiments, provided is an electrode for a lithium-ion battery comprising: a first lithium metal phosphate material comprising a first plurality of active material particles; and a second lithium metal phosphate material comprising a second plurality of active material particles, wherein both the first lithium metal phosphate material and the second lithium metal phosphate material are $LiMPO_4$, wherein M is one or more of iron (Fe) or manganese (Mn), and wherein the first lithium metal phosphate material is blended with the second lithium metal phosphate material at a weight ratio of greater than 1:1.

In some embodiments of the electrode, a D50 of the active material particles of the first plurality of active material particles of the first lithium metal phosphate material is less than a D50 of the active material particles of the second plurality of active material particles of the second lithium metal phosphate material.

In some embodiments of the electrode, the first plurality of active material particles comprises primary active material particles.

In some embodiments of the electrode, the second plurality of active material particles comprises primary active material particles and secondary active material particles.

In some embodiments of the electrode, the secondary active material particles of the second lithium metal phosphate material comprise aggregates of primary active material particles.

In some embodiments of the electrode, the first and second lithium metal phosphate materials are the same $LiMPO_4$.

In some embodiments of the electrode, the D50 of primary active material particles of the first plurality of active material particles of the first lithium metal phosphate material is from 150 nanometers to 2 microns.

In some embodiments of the electrode, the D50 of secondary active material particles of the second plurality of active material particles of the second lithium metal phosphate material is from 1 to 20 microns.

In some embodiments of the electrode, the blend of the first lithium metal phosphate material and the second lithium metal phosphate material comprises from 0.5 to 3 wt. % carbon.

In some embodiments of the electrode, the electrode has a resistivity of less than or equal to 600 ohm-cm.

In some embodiments of the electrode, the blend of the first lithium metal phosphate material and the second lithium metal phosphate material a tap density of greater than or equal to 0.8 g/cc.

In some embodiments of the electrode, the first lithium metal phosphate material is blended with the second lithium metal phosphate material at a weight ratio of greater than 3:2.

In some embodiments of the electrode, the first lithium metal phosphate material is blended with the second lithium metal phosphate material at a weight ratio of greater than 3:1.

In some embodiments of the electrode, the electrode has an electrode press density from 1.8 to 2.8 g/cc.

In some embodiments of the electrode, the D50 of primary active material particles of the first plurality of active material particles of the first lithium metal phosphate material is greater than or equal to 150 nanometers and a surface area of the primary active material particles of the first plurality of active material particles of the first lithium metal phosphate material is less than or equal to 15 $m^2/g$.

In some embodiments of the electrode, the D50 of at least one of primary active material particles of the first plurality of active material particles of the first lithium metal phosphate material or primary active material particles of the second plurality of active material particles of the second lithium metal phosphate material is less than or equal to 350 nanometers.

In some embodiments of the electrode, the D50 of primary active material particles of the first plurality of active material particles of the first lithium metal phosphate material is less than or equal to 350 nanometers.

In some embodiments, a rechargeable lithium-ion battery is provided, the battery comprising: an electrode comprising: a first lithium metal phosphate material comprising a first plurality of active material particles; and a second lithium metal phosphate material comprising a second plurality of active material particles, wherein both the first lithium metal phosphate material and the second lithium metal phosphate material are $LiMPO_4$, wherein M is one or more of iron (Fe) or manganese (Mn), and wherein the first lithium metal phosphate material is blended with the second lithium metal phosphate material at a weight ratio of greater than 1:1.

In some embodiments, an electric vehicle system is provided, the electric vehicle system comprising a rechargeable lithium-ion battery comprising: an electrode comprising: a first lithium metal phosphate material comprising a first plurality of active material particles; and a second lithium metal phosphate material comprising a second plurality of active material particles, wherein both the first lithium metal phosphate material and the second lithium metal phosphate material are $LiMPO_4$, wherein M is one or more of iron (Fe) or manganese (Mn), and wherein the first lithium metal phosphate material is blended with the second lithium metal phosphate material at a weight ratio of greater than 1:1.

The embodiments disclosed above are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1A:
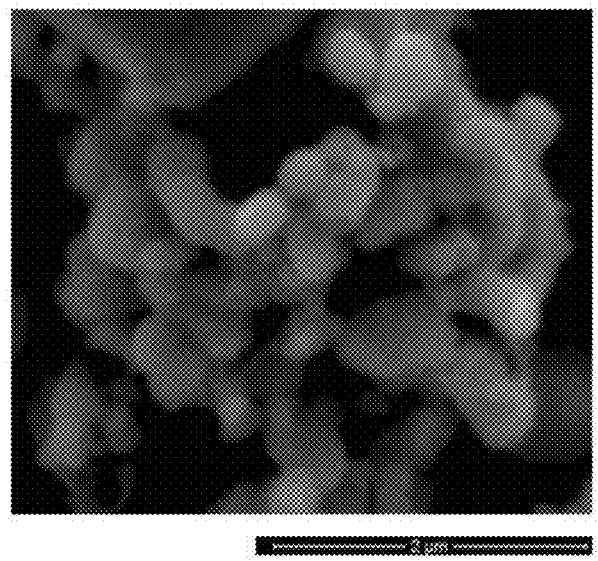
FIG. 1A shows a scanning electron microscope image of an active material comprising only primary particles, according to some embodiments.

Provided herein are blends of active materials, cathodes comprising blends of active materials, lithium-ion batteries having cathodes comprising blended active materials, electric vehicles comprising a lithium-ion battery having a cathode comprising blended active materials, and methods for blending cathode active materials.

Most electric vehicles rely on rechargeable lithium-ion batteries as the primary source of power. The cathode of the rechargeable lithium-ion battery, and more specifically the electrochemistry of the rechargeable lithium-ion battery, can affect the performance of the battery (e.g., energy density, cycle life). For example, one commonly-used cathode material for rechargeable lithium-ion batteries is lithium metal phosphate material ($LiMPO_4$), where M can be iron (Fe) or manganese (Mn), or a mixture of both Fe and Mn.

Generally speaking, different grades of lithium metal phosphate materials are used to achieve specific target battery properties. For example, for high power applications, lithium metal phosphate materials having smaller particles are generally utilized. For high energy density applications, lithium metal phosphate materials having larger particles are generally utilized. However, to achieve a battery having both suitable power and suitable energy density, for example, an electrode may be fabricated using a blend of two or more lithium metal phosphate materials as described herein.

It has been determined that performance characteristics of lithium-ion batteries (and electric vehicles powered by such lithium-on batteries) can be optimized by blending cathode active materials according to specific ratios as described herein.

In some embodiments, the blended active materials can include a first lithium metal phosphate material comprising a first plurality of particles and a second lithium metal phosphate material comprising a second plurality of particles. In some embodiments, the first plurality of particles of the first lithium metal phosphate material have a D50 of between 150 nanometers (nm) and 2 micrometers (μm). In some embodiments, the second plurality of particles of the second lithium metal phosphate material have a D50 of between 1 and 20 μm. In some embodiments, the second plurality of particles are aggregates of primary particles, and can be formed by spray drying. In some embodiments, the D50 of the secondary particles is larger than the D50 of the primary particles. As used herein, "D50" refers to the median particle size measured from the particle size analyzer (PSA), or the particle size (diameter) at 50% in a cumulative distribution. Since primary particle tends to aggregate to each other, especially in nanosized powders, the PSA measurement value (e.g., D10, D50, D90, D100) does not always represent the size of single-crystal particle. Further, as used here, "D10" refers to the particle size (diameter) at 10% in a cumulative distribution, and "D90" refers to the particle size (diameter) at 90% in a cumulative distribution.

Both the first lithium metal phosphate material and the second metal phosphate material have the chemical formula $LiMPO_4$, wherein M is one or more of iron (Fe) or manganese (Mn). In some embodiments, both the first and second lithium metal phosphate materials may have the same chemical formula. In some embodiments, the first and second lithium metal phosphate materials may have different chemical formulas.

To form the blended active material for use in a cathode, the first lithium metal phosphate material is blended with the second lithium metal phosphate material at a weight ratio of greater than 1:1 (i.e., the total weight of the first lithium metal phosphate material comprising a first plurality of particles is greater than that of the second lithium metal phosphate material comprising a second plurality of particles). The exact blend ratio can be determined based on the target performance properties, as described in further detail below.

FIG. 1A shows a scanning electron microscope image of an active material comprising only primary particles, according to some embodiments. This material depicted in FIG. 1A may be the "first lithium metal phosphate material" and/or the "second lithium metal phosphate material" as described herein. The material of FIG. 1A may also be a $LiMPO_4$ material, wherein M is one or more of iron (Fe) or manganese (Mn).

In some embodiments, the primary particles are roughly spherical in shape. As indicated by the scale provided in the figure, the primary particles of the material depicted in FIG. 1A are measured in nanometers (i.e., significantly smaller than 1 micron as depicted). However, the size of the particles depicted in FIG. 1A is just one example of a suitable particle size. Different embodiments of the blended active materials described herein may include a lithium metal phosphate material comprising primary particles of a different size than that which is depicted in the Figure. For example, the D50 of the primary particles of a lithium metal phosphate material for a blended active material as described herein may be from 300 nanometers (nm) to 2 micrometers (μm), or 150 nm to 1 μm. In some embodiments, the D50 of the primary particles of a lithium metal phosphate material may be less than or equal to 2 μm, 1 μm, 750 nm, 500 nm, or 250 nm. In some embodiments, the D50 of the primary particles of a lithium metal phosphate material may be greater than or equal to 150 nm, 250 nm, 500 nm, 750 nm, or 1 μm. "D50" refers to the median particle size measured from the particle size analyzer (PSA); therefore, D10 may be less than or equal to the D50. In some embodiments, the lithium metal phosphate material comprises only primary particles and no secondary particles. Smaller primary particles have a shorter path for lithium-ion diffusion during a charge and discharge process, which means that smaller primary particles are typically better for a high C-rate charge/discharge process. Also, at low temperature operation, lithium diffusion is hindered. Therefore, smaller primary particles have a higher chance to pull in/out more lithium during low temperature operation.

In some embodiments, the primary particles of a lithium metal phosphate material have a particle size (including D10-D90) of 20 nanometers (nm) to 100 micrometers (μm). In some embodiments, the primary particles of the lithium metal phosphate material have a particle size (including D10-D90) of less than or equal to 100 μm, 50 μm, 1 μm, 750 nm, 500 nm, 250 nm, or 100 nm. In some embodiments, the primary particles of a lithium metal phosphate material have a particle size (including D10-D90) of greater than or equal to 20 nm, 100 nm, 250 nm, 500 nm, 750, 1 μm, or 50 μm.

In some embodiments, the material of FIG. 1A may not optimal for achieving good tab and packing density. This is due to having a relatively large amount of void space in between the relatively small particles that are similar in size. Having a larger distribution of particle sizes help achieve better tab and packing density. In some embodiments, this material may be less optimal for low temperature performance, particularly if the primary particle size is too large.

Figure 1B:
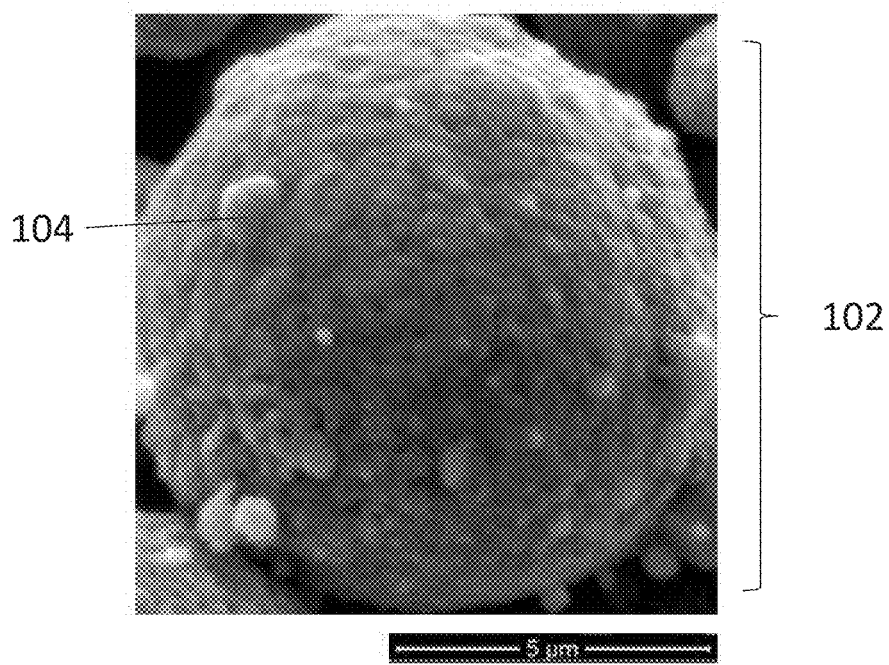
FIG. 1B shows a scanning electron microscope image of an active material comprising secondary spherical particles made of primary particles, according to some embodiments.

FIG. 1B shows a scanning electron microscope image of an active material comprising secondary spherical particles. In particular, the secondary particles shown in the Figure comprise smaller primary particles. This material depicted in FIG. 1B may be the "second lithium metal phosphate material" as described herein. The material of FIG. 1B may also be a LiMPO$_4$ material, wherein M is one or more of iron (Fe) or manganese (Mn).

The material depicted in FIG. 1B is a secondary spherical particle 102 having primary particles 104 embedded within. Primary particles are generally single crystals, whereas secondary particles are aggregates of primary (single crystal) particles that are intentionally formed using a spray-drying technique. In the embodiment depicted in FIG. 1B, the secondary particles are generally larger than the primary particles in both FIGS. 1A and 1n FIG. 1B. However, this may not always be the case. Further, the primary particles of FIG. 1B are not necessarily identical (based on, for example, chemical formula, crystalline structure, etc.) to those of FIG. 1A. The primary particles can be fabricated to a significantly larger size (i.e., up to 10-25 micrometers, or so) upon higher heat treatment temperature and/or using larger precursors. In some embodiments, the secondary particles can be spray-dried as small as 1 micrometer.

The size of both the primary particles and the secondary particles depicted in FIG. 1B is just one example of suitable particle sizes. Different embodiments of the blended active materials described herein may include a lithium metal phosphate material comprising primary particles or secondary particles having a different particle size distribution than that which is depicted in the Figure. For example, in some embodiments, the D50 of the secondary particles of a lithium metal phosphate material for a blended active material as described herein may be from 1 to 100 or from 1 to 50 micrometers (μm). In some embodiments, the D50 of the secondary particles of a lithium metal phosphate material may be less than or equal to 100, 50, 40, 30, 20, 10, or 5 μm. In some embodiments, the D50 of the secondary particles of a secondary lithium metal phosphate material may be greater than or equal to 1, 5, 10, 20, 30, 40, or 50 μm. A lithium metal phosphate material comprising a wider range of secondary particle sizes can improve the press density of the material, in turn increasing the energy density.

In some embodiments, secondary particles of a lithium metal phosphate material for a blended active material as described herein may have a particle size (D10-D90) of 1 to 100 micrometers (μm). In some embodiments, secondary particles of a lithium metal phosphate material for a blended active material as described herein may have a particle size (D10-D90) of less than or equal to 100, 75, 50, or 25 μm. In some embodiments, secondary particles of a lithium metal phosphate material for a blended active material as described herein may have a particle size (D10-D90) of greater than or equal to 1, 25, 50, or 75 μm.

The D50 of the primary particles shown in FIG. 1B may be from 300 nanometers (nm) to 2 micrometers (μm), or 150 nm to 1 μm. In some embodiments, the D50 of the primary particles may be less than or equal to 2 μm, 1 μm, 750 nm, 500 nm, or 250 nm. In some embodiments, the D50 of the primary particles may be greater than or equal to 150 nm, 250 nm, 500 nm, 750 nm, or 1 μm. In some embodiments, the primary particles have a particle size (including D10-D90) of 20 nanometers (nm) to 100 micrometers (μm). In some embodiments, the primary particles have a particle size (including D10-D90) of less than or equal to 100 μm, 50 μm, 1 μm, 750 nm, 500 nm, 250 nm, or 100 nm. In some embodiments, the primary particles of a lithium metal phosphate material have a particle size (including D10-D90) of greater than or equal to 20 nm, 100 nm, 250 nm, 500 nm, 750, 1 μm, or 50 μm.

In some embodiments, the D50 of the particles of the second lithium metal phosphate material is greater than the D50 of the first lithium metal phosphate metal material. In some embodiments, the D50 of the particles of the second lithium metal phosphate material is 1.1-350 times larger than the D50 of the particles of the first lithium metal phosphate material. In some embodiments, the D50 of the particles of the second lithium metal phosphate material is less than or equal to 350, 300, 250, 200, 150, 100, 75, 50, 25, 10, or 5 times larger than the D50 of the particles of the first lithium metal phosphate material. In some embodiments, the D50 of the particles of the second lithium metal phosphate material is greater than or equal to 1.1, 5, 10, 25, 50, 75, 100, 150, 200, 250, or 300 times larger than the D50 of the particles of the first lithium metal phosphate material.

In some embodiments, the material of FIG. 1B may be optimal for rate performance and low temperature performance, particularly if the primary particles within the secondary particles are very small (less than 200 nm). If the secondary particle sizes are similar to one another, this material may be less optimal for energy density, since there will be void spaces when pressing the prepared electrode between the similar-sized secondary particles. However, this can be optimized if there are different secondary particle size distributions as well reduces the void spaces.

Figure 1C:
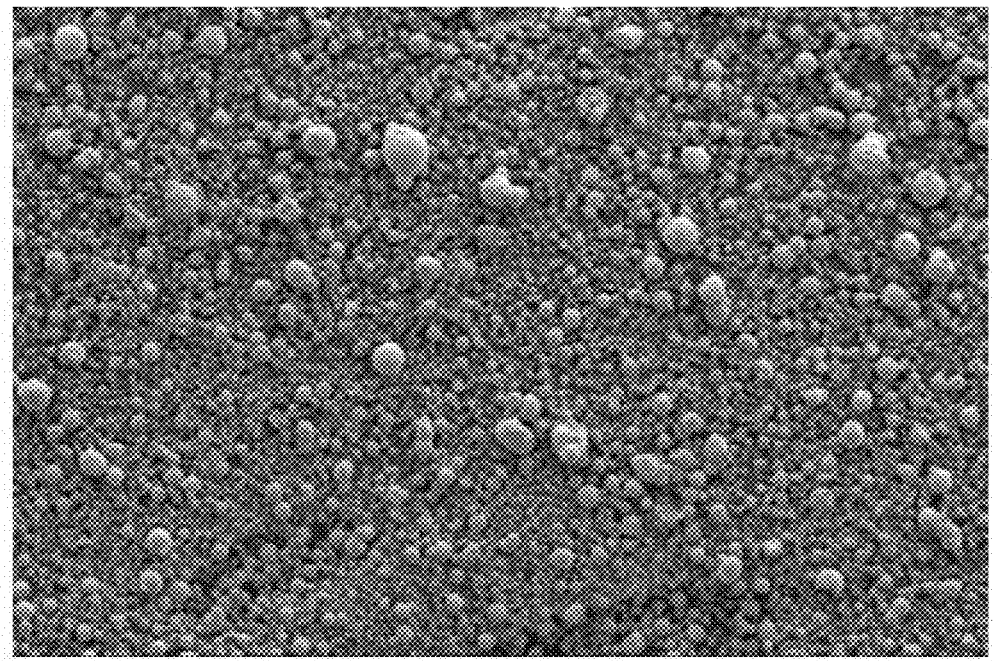
FIG. 1C shows a scanning electron microscope image of a blended active material comprising a first active material comprising only primary particles and a second active material comprising secondary spherical particles, according to some embodiments.

FIG. 1C shows a scanning electron microscope image of a blended active material comprising a first active material comprising only primary particles (e.g., that which is depicted in FIG. 1A) and a second active material comprising secondary particles (e.g., that which is depicted in FIG. 1B), according to some embodiments. As shown in the figure, the blended material comprises a wider variety of particles and particle sizes than that of just the first lithium metal phosphate material or the second lithium metal phosphate material.

Below is a table showing exemplary differences in properties among the three materials. The "large secondary" column may be representative of a second lithium metal phosphate material (e.g., the material of FIG. 1B), the "small particle" column may be representative of a first lithium metal phosphate material (e.g., the material of FIG. 1A), and the "blended" column may be representative of a blended active material comprising a blend of a first lithium metal phosphate material and a second lithium metal phosphate material (e.g., the material of FIG. 1C).

|  | Parameters | Large Secondary | Small particle | Blended |
|---|---|---|---|---|
| Materials | D50/μm | >5 | <1.5 | Intermediate |
| Property | Specific Surface Area (m$^2$/g) | 10.0 ± 2.0 | 11.5 ± 2.0 | Intermediate |
|  | Carbon content | Low | High | Intermediate |
|  | Tap density (g/cc) | ≥1.2 | 0.8 ± 0.2 | Intermediate |
|  | Powder compact (pellet) density (g/cc) | Low | Medium | High |

|  | Parameters | Large Secondary | Small particle | Blended |
|---|---|---|---|---|
| E-Chem | Low C-rate discharge capacity (mAh/g) | ~150 | ~150 | ~150 |
|  | Efficiency(%) | ~95 | ~95 | ~95 |
|  | Low temperature | High (if primary particle within the secondary particle is very small) | Medium | Medium-High |
| Slurry | Hegman | Agglomeration | Uniform | Acceptable |

The specific blending ratio of the first lithium metal phosphate material with the second lithium metal phosphate material may be selected based on target properties of the active material and/or a battery comprising an electrode fabricated with the blended active material. In some embodiments, the weight ratio between the first lithium metal phosphate material and the second metal phosphate material is greater than 1:1 (i.e., the total weight of the first lithium metal phosphate material is greater than the total weight of the second lithium metal phosphate material). In some embodiments, the weight ratio between the first lithium metal phosphate material and the second metal phosphate material is from 1:1-9.5:1, 3:2-9:1, or 2:1-4:1. In some embodiments, the weight ratio between the first lithium metal phosphate material and the second metal phosphate material is greater than 3:2, 2:1, 7:3, 3:1, 4:1, 9:1, or 9.5:1. In some embodiments, the weight ratio between the first lithium metal phosphate material and the second metal phosphate material is less than or equal to 9.5:1, 9:1, 4:1, 3:1, 7:3, 2:1, or 3:2. Generally, for an electric vehicle application that requires high energy density, larger lithium metal phosphate primary particle with D50 approaching 500 nm to 1 μm is most beneficial for achieving higher energy loading target. However, larger particles have reduced rate and low temperature performance. Very small primary particles (i.e., less than 300 nm), either as the primary particle, or within the secondary particles, are beneficial to improve the rate and low temperature performance.

Figure 2A:
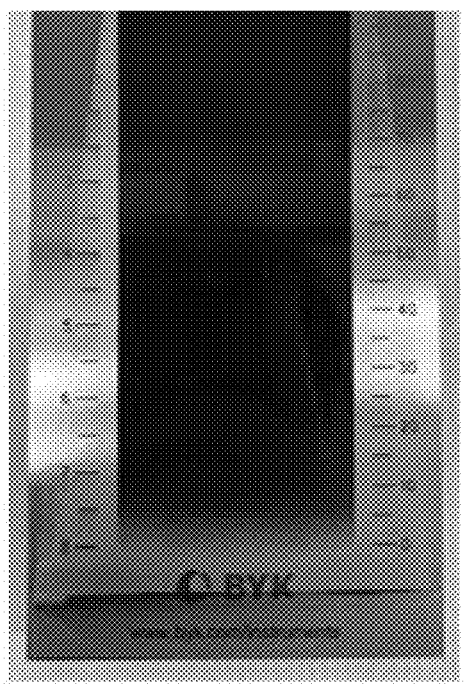
FIG. 2A shows a coating layer comprising an active material comprising only primary particles, according to some embodiments.
Figure 2B:
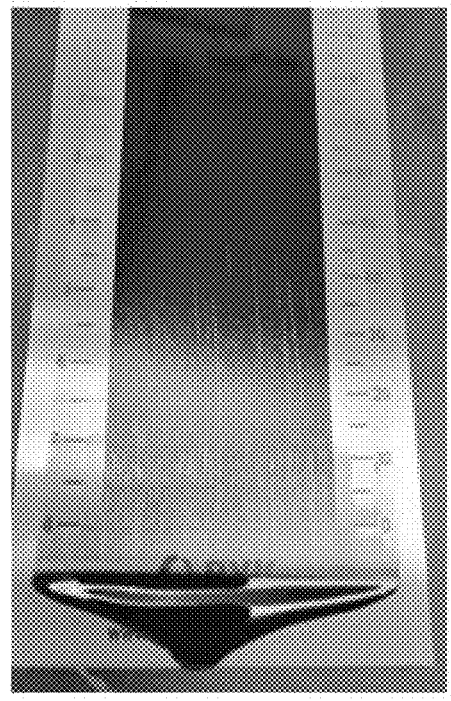
FIG. 2B shows a coating layer comprising an active material comprising secondary particles, according to some embodiments.
Figure 2C:
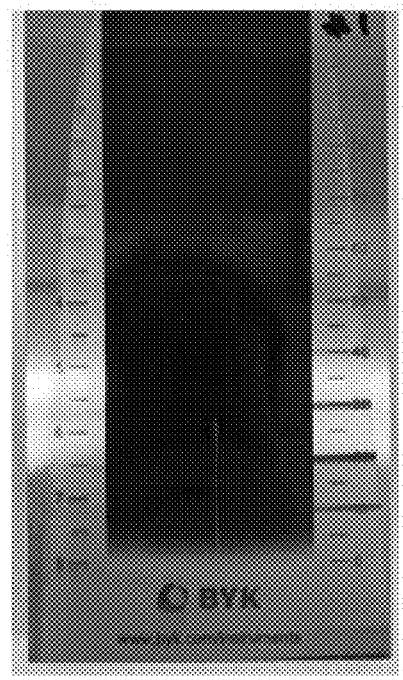
FIG. 2C shows a coating layer comprising a blend of a first active material comprising only primary particles and a second active material comprising secondary particles, according to some embodiments.

FIG. 2A shows a Hegman gauge testing comprising an active material comprising only primary particles, according to some embodiments. As shown, the small primary particles can provide a clean, smooth coating without showing too many aggregates on the right side of a grindometer gauge (unit: μm). FIG. 2B shows a Hegman gauge testing comprising an active material comprising secondary particles, according to some embodiments. The larger aggregate particles of this material can cause inconsistencies or imperfections in the coating layer, where a large aggregate can cause a "dragging line" or shown as a "spot". However, FIG. 2C shows a Hegman gauge testing comprising a blend of a first active material and a second active material, according to some embodiments. This blended material can be used to form a material having a Hegman gauge testing with acceptable physical characteristics (e.g., fewer inconsistencies or imperfections as compared to that of FIG. 2B, where a "dragging line" appears at 30 μm scale bar that can be coated with additional filtering step in the mass production scale).

Figure 3A:
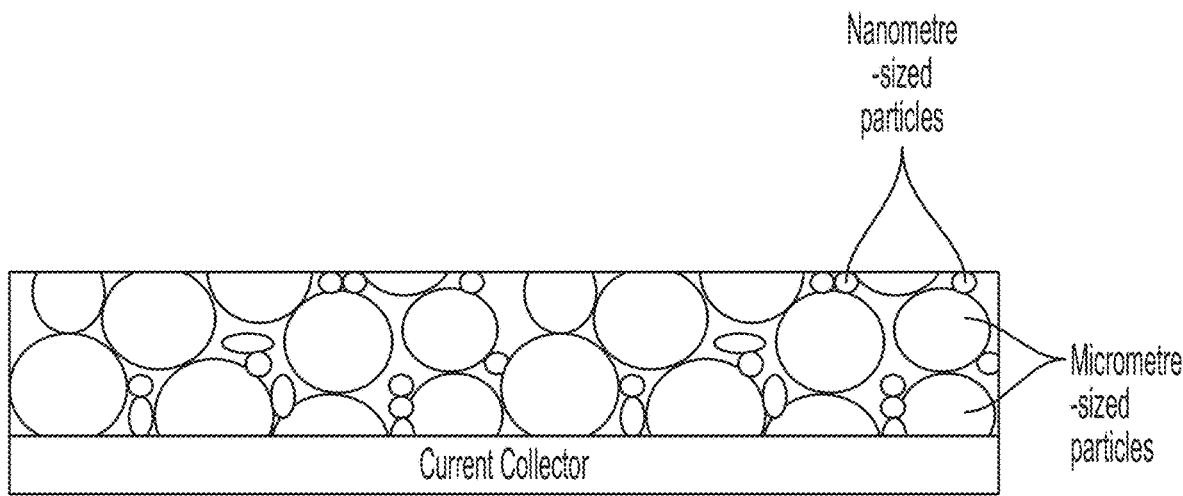
FIG. 3A shows a drawing of an electrode comprising small primary and large secondary particles leading to higher tap and/or electrode density, according to some embodiments.
Figure 3B:
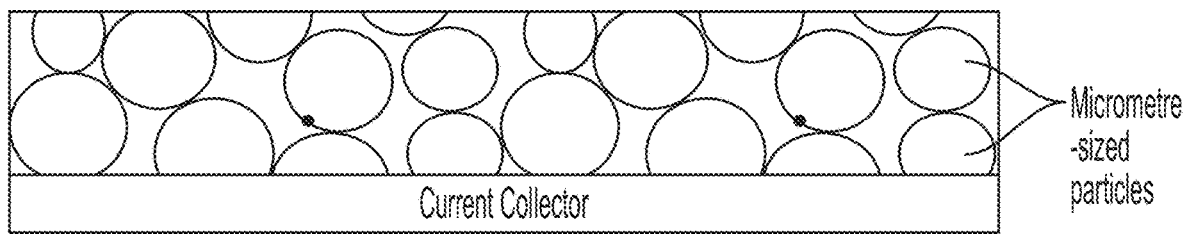
FIG. 3B shows a drawing of an electrode comprising secondary particles or larger primary particles relative to the particles in FIG. 3A leading to higher porosity, according to some embodiments.

FIG. 3A shows a drawing of an electrode comprising small primary and large secondary particles leading to higher tap and/or electrode density, according to some embodiments, and FIG. 3B shows a drawing of an electrode comprising secondary particles or larger primary particles relative to the particles in FIG. 3A leading to higher porosity, according to some embodiments. As shown in FIG. 3A, the smaller primary particles may be able to fill in the interstices formed by the larger secondary particles. Thus, the electrode comprising both smaller nanometer-sized particles (e.g., smaller primary particles) and slightly larger (sub-) micrometer-sized particles will have a greater packing density than that of a material having a more uniform particle size (regardless of whether the material having a more uniform particle size includes primary particles and/or secondary particles).

In general, an electrode comprising a material having a narrower particle distribution (i.e., a more uniform particle size) will cause lower tap/packing density. In contrast, the packing density of a blended material having a first lithium metal phosphate material comprising a first plurality of particles and a second lithium metal phosphate material having a second plurality of particles may be higher, since the particle size variation between the first material and the second material is greater than that of a single lithium metal phosphate material. In some embodiments, the packing density of a blended material as described herein may be 1.5-3 g/cc. In some embodiments, the packing density of a blended material as described herein may be less than or equal to 3, 2.9, 2.8, 2.7, 2.6, 2.5, 2.4, 2.3, 2.2, 2.1, 2, 1.9, 1.8, 1.7, or 1.6 g/cc. In some embodiments, the packing density of a blended material as described herein may be greater than or equal to 1.5, 1.6, 1.7, 1.8, 1.9, 2.0, 2.1, 2.2, 2.3, 2.4, 2.5, 2.6, 2.7, 2.8, 2.9, or 3 g/cc. A greater packing density can increase the volumetric energy density of a given battery cell, module, and pack.

Methods of Blending a First Lithium Metal Phosphate Material and a Second Lithium Metal Phosphate Material In some embodiments, a blended active material described above may be formed by blending a first lithium metal phosphate material and a second lithium metal phosphate material at a predetermined weight ratio. For example, the first lithium metal phosphate material can be blended with the second lithium metal phosphate material at a blending weight ratio of 4:1. To adequately blend the two materials together to achieve a blended material, the first and second lithium metal phosphate materials may be blended together by simple blending, dry milling, or wet milling. Simple blending includes pre-mixing two materials together during a slurry preparation step. Dry milling includes a ball milling process without a solvent. Wet mill is a ball milling process with a solvent such as an aqueous solution such as $H_2O$), isopropyl alcohol, ethanol, acetone, any other organic solvent, or any mixture thereof.

Other blending methods can be used to mix the first lithium metal phosphate material and the second metal phosphate material. For example, suitable methods may include simple blending, ball milling, or mechanochemical mixing.

EXAMPLES

Example 1: Slurry Solids Content and Surface Area

Figure 4A:
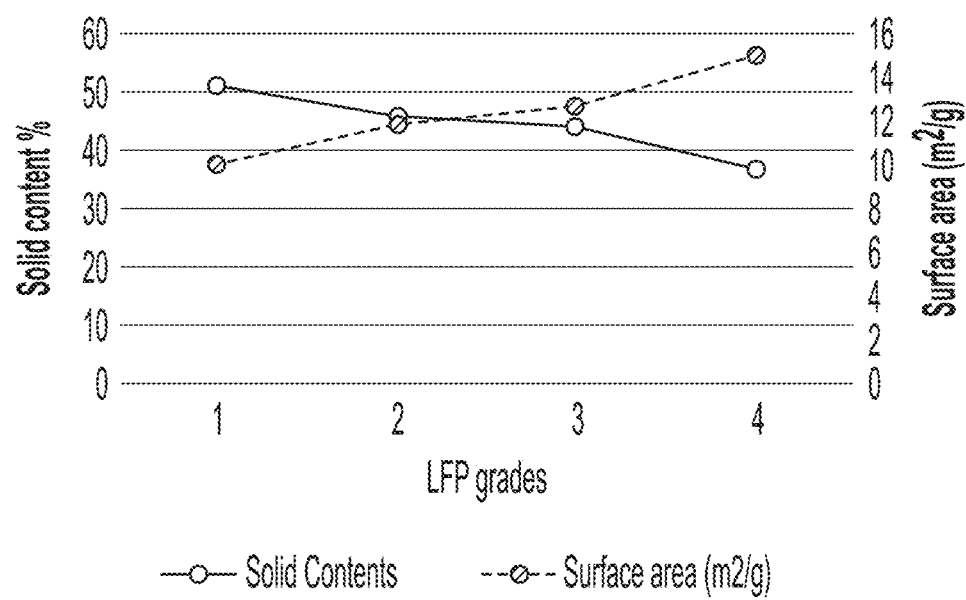
FIG. 4A is a graph showing the relationship between solids content in slurry and surface area of cathode active materials for four different grades of lithium iron phosphate material, according to some embodiments.

FIG. 4A is a graph showing the relationship between solids content and surface area for four different grades of lithium iron phosphate material, according to some embodiments. Samples with a higher surface area (e.g., LFP 4 in FIG. 4A) generally have higher carbon content and/or a very small particle size. Generally, having higher carbon content (and higher surface area) can increase the total surface area of LFP/C even if LFP particles are the same size. Higher surface area LFP/C will require more solvent, which will cause the solid contents to be lower, since the wetting process will require more solvent (e.g., n-Methyl-2-pyrrolidone or NMP) to lower the viscosity of slurry that can be "coat-able" in the slot die coater. For example, going from 9 m$^2$/g to 15 m$^2$/g will generate a 6 m$^2$ increase in the surface area per gram of active material. For ten grams of LFP/C, the increase will be 60 m$^2$, for 1 kg, 6,000 m$^2$, and for 1 ton, 6,000,000 m$^2$ increase in the active surface area.

For blended material comprising a first lithium metal phosphate material comprising a first plurality of particles and a second lithium metal phosphate material comprising a second plurality of particles, the surface area of the particles may be 3-30 or 5-15 m$^2$/g. As mentioned above, smaller particles are good for helping Li$^+$ diffusion (better rate, better low temperature performance), but in terms of processability and cost (i.e., more NMP required), it is better to have materials with reduced surface areas. The maximum target surface area for blended LFP, for instance, should be reduced to 18 m$^2$/g for the processability concern. In some embodiments, the surface area of the particles of a blended material comprising a first lithium metal phosphate material comprising a first plurality of particles and a second lithium metal phosphate material comprising a second particles may be less than or equal to 30, 25, 20, 15, 14, 13, 12, 11, 10, 9, 8, 7, 6, or 5 m$^2$/g. In some embodiments, the surface area of the particles of a blended material comprising a first lithium metal phosphate material comprising a first plurality of particles and a second lithium metal phosphate material comprising a second plurality of particles may be greater than or equal to 3, 5, 10, 11, 12, 13, 14, 15, 16, 17, 18, 19, 20, or 25 m$^2$/g. Materials comprising particles having a higher surface area require more solvent. There is also an increased possibility of dissolution of active material with the electrolyte of the battery with particles having a higher surface area, particularly if the surface M-O octahedrons are less coordinated (e.g., $MO_5$, $MO_4$, etc.), when compared to $MO_6$ octahedrons in the bulk.

Example 2: Tap Density and Carbon Content

Figure 4B:
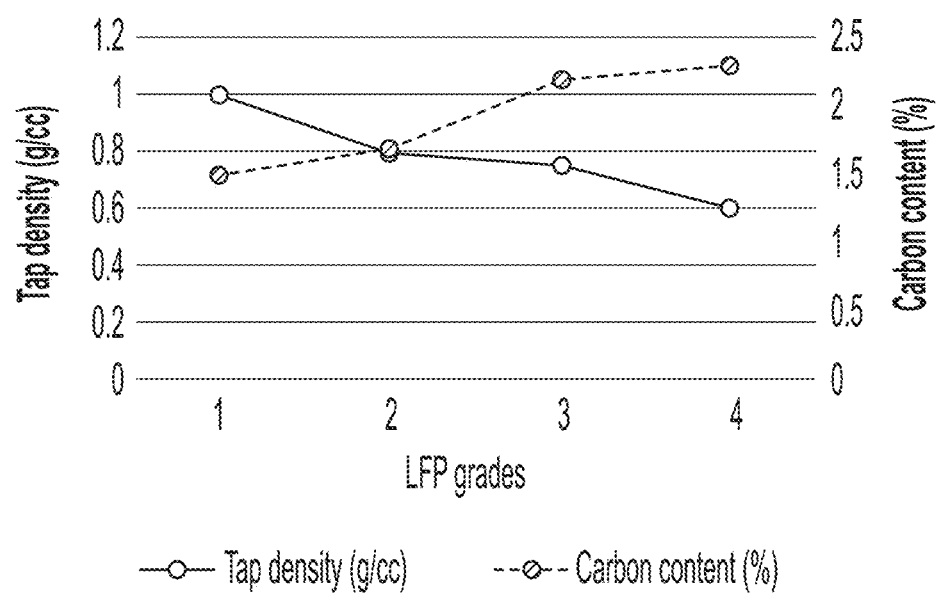
FIG. 4B is a graph showing the relationship between tap density and carbon content for four different grades of lithium iron phosphate material, according to some embodiments.

FIG. 4B is a graph showing the relationship between tap density and carbon content for four different grades of lithium iron phosphate material, according to some embodiments. Note that the four different grades of lithium iron phosphate material are different from those shown in FIG. 4A. Generally, and as shown in the graph, lithium iron phosphate materials with a higher carbon content have a lower tap density. Further, lithium iron phosphate materials with higher carbon content also generally have a lower adhesion strength to an aluminum current collector when electrode loading level and press density is high. Typically, the strength of coating is determined by the surface quality of the active material coatings. In a given electrode, binder acts as a glue to bridge the particles with conductive agent, as well as with the current collector. Increased carbon content will lead to increased surface area, which reduces the coverage of binder content at the interface. In order to prevent this, C-coated foil (which includes a carbon coating layer, plus a binder) that alters the interface between the electrode and foil must be used, which is more expensive than regular Al foil.

For blended material comprising a first lithium metal phosphate material comprising primary particles and a second lithium metal phosphate material having secondary particles, the carbon content may be from 0.5 to 3 wt. % or 0.8 to 1.6 wt. % of the electrode material. In some embodiments, the carbon content may be less than or equal to 3, 2.5, 2, 1.5, or 1 wt. % of the electrode material. In some embodiments, the carbon content may be greater than or equal to 0.5, 1, 1.5, 2, or 2.5 wt. % of the electrode material. As the carbon content of a lithium metal phosphate material increases, so too does the total BET (Brunauer, Emmett and Teller) surface area, which is generally undesirable. A higher carbon content also generally reduces the tap density, as described above. Conversely, insufficient carbon content can cause low electrical conductivity and poor electrochemical performance.

In some embodiments, a blended material comprising a first lithium metal phosphate material comprising primary particles and a second lithium metal phosphate material having secondary particles may have a tap density of 0.8-1.5 g/cc. In some embodiments, the tap density may be less than or equal to 1.5, 1.4, 1.3, 1.2, 1.1, or 1.0 g/cc. In some embodiments, the tap density may be greater than or equal to 0.8, 0.9, 1.0, 1.1, 1.2. or 1.3 g/cc. A higher tap density relates to better packing of the electrodes.

Example 3: Resistivity and Carbon Content

Figure 4C:
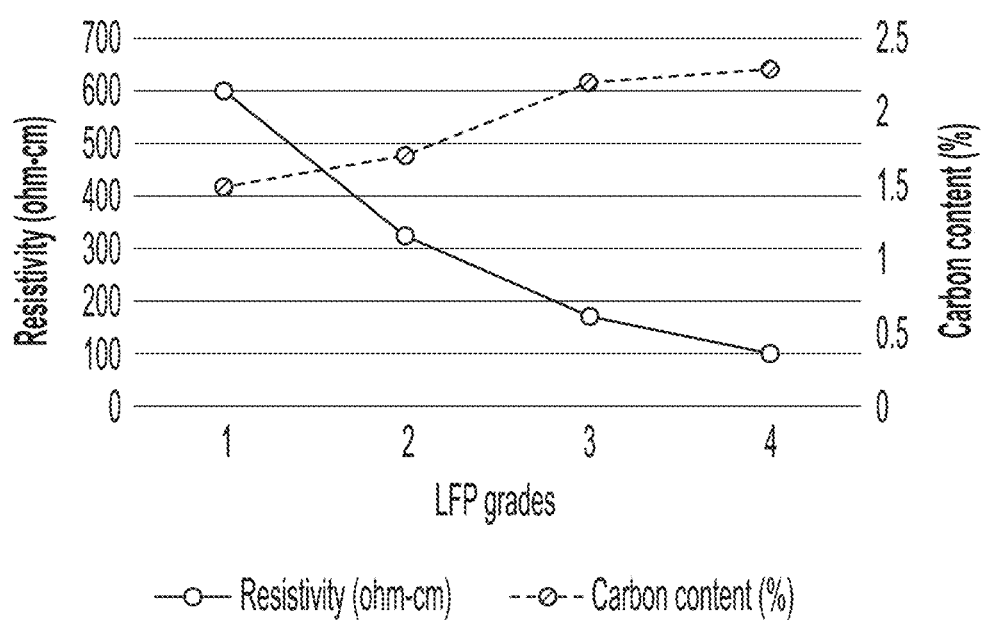
FIG. 4C is a graph showing the relationship between electrical resistivity and carbon content for four different grades of lithium iron phosphate material, according to some embodiments.

FIG. 4C is a graph showing the relationship between resistivity and carbon content for four different grades of lithium iron phosphate material, according to some embodiments. Note that the four different grades of lithium iron phosphate material of FIG. 4C are different than the materials shown in FIGS. 4A and 4B. As shown in the graph, lithium iron phosphate material having a greater carbon content generally have a lower electrical resistivity.

In some embodiments, blended active material having a first lithium metal phosphate material may have a resistivity of 100-700 ohm-cm. In some embodiments, blended active material having a first lithium metal phosphate material may have a resistivity of less than or equal to 700, 600, 500, 400, 300, 200, or 100 ohm-cm. In some embodiments, blended active material having a first lithium metal phosphate material may have a resistivity of greater than or equal to 10, 20, 30, 40, 50, 60, 70, 80, or 90 ohm-cm.

Example 4: Room Temperature Performance

Figure 5:
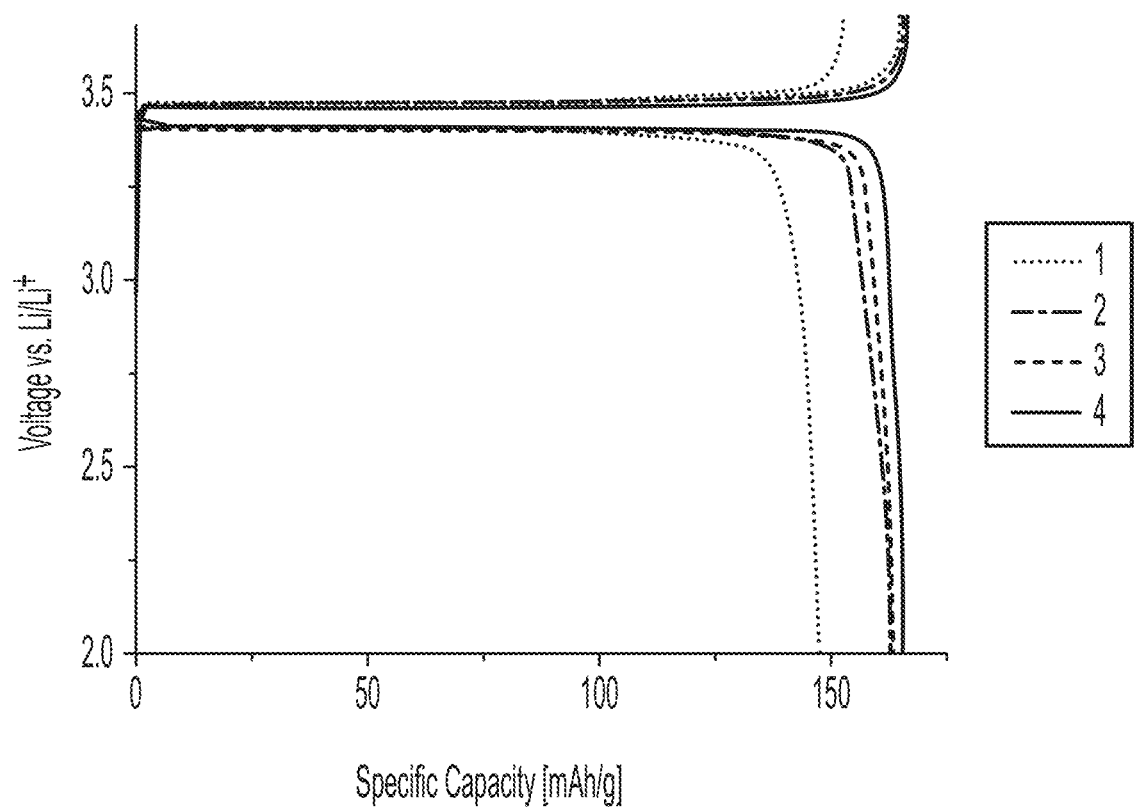
FIG. 5 is a graph showing room temperature electrochemical performance of four different lithium-ion batteries using a coin half-cell with metallic lithium anode, each comprising a different active material or blend of active materials, according to some embodiments.

FIG. 5 is a graph showing room temperature performance of four different lithium-ion half-cell batteries, each comprising a different active material or blend of active materials, according to some embodiments. Properties of each of the batteries tested are provided in the table below:

|  | Size range (μm) | Specific Surface Area (m$^2$/g) | Powder compact (pellet) density (g/cc) |
|---|---|---|---|
| Sample 1 | 0.6-10 | 9.5-13.5 | 2.2-2.3 |
| Sample 2 | 5.0-25 | 8.0-12.0 | 2.4-2.5 |
| Sample 3 | 0.2-6.2 | 12-13 | 2.5-2.55 |
| Sample 4 | 1.3-3.3 | 11-12 | 2.5-2.6 |

Further, Sample 1 included small to medium to large sized primary particles only, Sample 2 included medium to large micron-sized secondary, where very small primary particles are embedded within, Sample 3 included small, medium, and large primary particles only, and Sample 4 included narrower-band primary particles only (when compared to Sample 3).

As shown in the graph of FIG. 5, there is no significant difference among samples 1, 2, and 3. However, sample 4 leads to slightly lower discharge capacity than 1, 2, and 3. Since the test is conducted at room temperature at low rate, there is not too much variation, since the test condition provides enough time for most of Li$^+$ ions to enter in and out from the cathode electrode.

Example 5: Discharge

Figure 6:
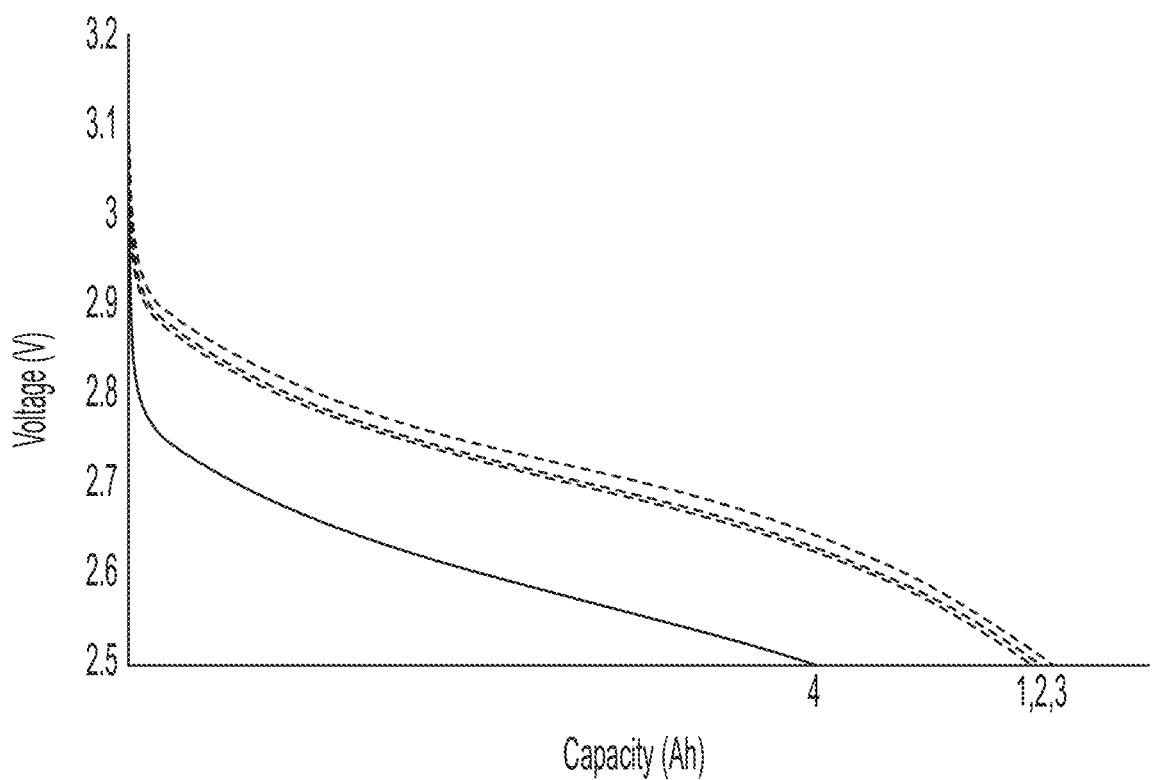
FIG. 6 is a graph showing discharge curves for four different lithium-ion batteries using a full cell with graphite anode at low temperature (−10° C.) and high C-rate (2 C), each comprising a different active material or blend of active materials, according to some embodiments.

FIG. 6 is a graph showing discharge curves for four different lithium-ion batteries, each comprising a different active material or blend of active materials, according to some embodiments. The batteries used the same electrode weight formulation (active material:conductive carbon: binder contents), same graphite anode, same separator, and identical conditions except the cathode materials, and described above. (Samples 1-4 in FIG. 6 are the same as samples 1-4 of FIG. 5.)

The tests conducted and depicted in FIG. 6 were all small pouch fill cell tests at high rate, at low temperature. Since the Li ion diffusion kinetic is very slow in this condition, it is shown that the voltage plateau is no longer a flat line at 3.2 V vs. graphite (in comparison to FIG. 5). It should be appreciated that since cell data from FIG. 5 is from a half cell testing configuration, a flat line exists at 3.4 V vs. Li/Li$^+$, which is equivalent to 3.2 V vs. graphite.

Example 6: Discharge Rate

Figure 7A:
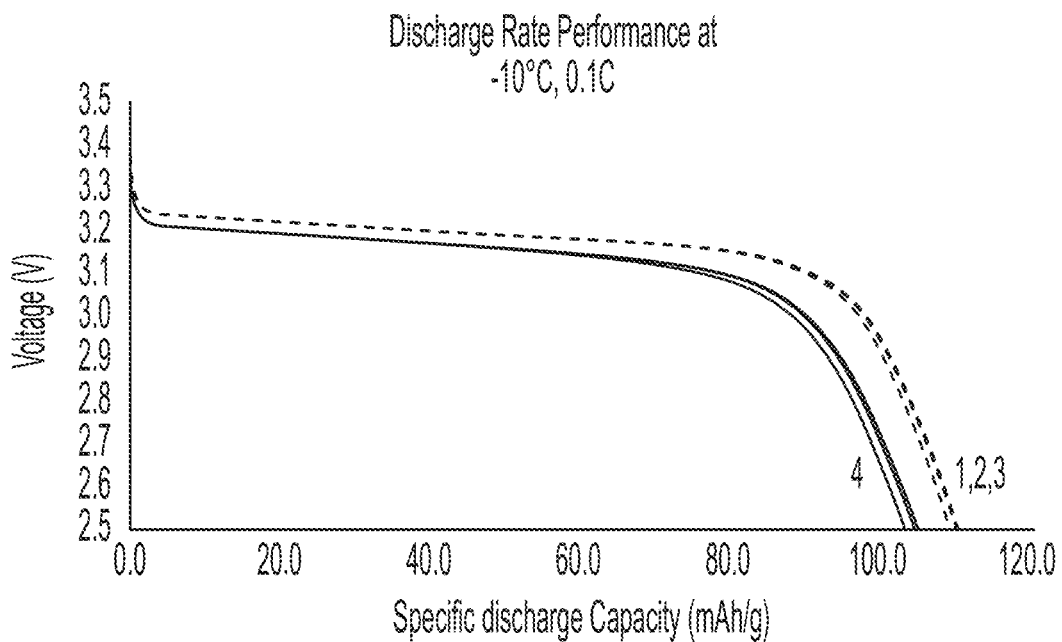
FIG. 7A is a graph showing various discharge rate performance for four different lithium-ion batteries using a full cell with graphite anode at low temperature (−10° C.) and low C-rate (0.1 C, 10 hours discharge), each comprising a different active material or blend of active materials, according to some embodiments.

FIG. 7A is a graph showing various discharge rate performance for four different lithium-ion batteries, each comprising a different active material or blend of active materials, according to some embodiments. Specifically, the tests shown in FIG. 7A were conducted at −10° C. and 0.1C. Sample 1 included small to medium to large sized primary particles. From the blending perspectives, larger particles will not contribute to the capacity at this test conditions. Sample 2 is larger secondary particles, but include small primary particles, that contribute to the discharge capacity at this test condition. Sample 3 case is similar to Sample 1 but has much smaller particles and large particles aren't too big. Sample 4 that only contains medium to large particle leads to the lowest capacity at this test condition. (Samples 1-4 in FIG. 7A are the same as samples 1-4 of FIGS. 5 and 6.)

Example 7: Discharge Rate

Figure 7B:
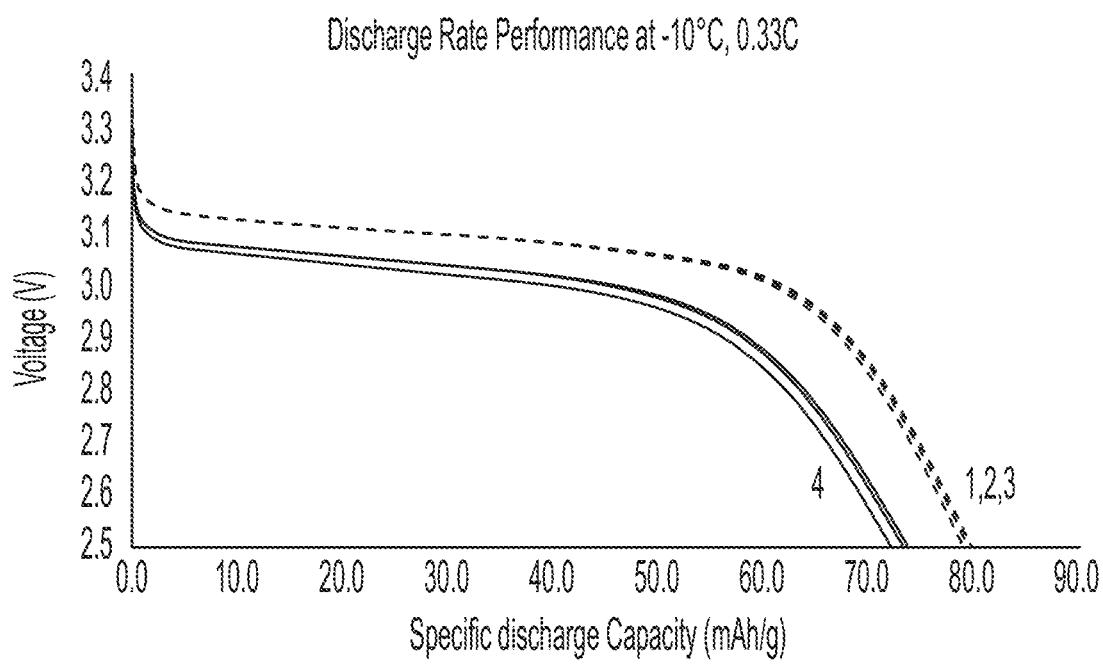
FIG. 7B is a graph showing various discharge rate performance for four different lithium-ion batteries using a full cell with graphite anode at low temperature (−10° C.) and normal operation C-rate (0.33 C, 3 hours discharge), each comprising a different active material or blend of active materials, according to some embodiments.

FIG. 7B is a graph showing various discharge rate performance for four different lithium-ion batteries, each comprising a different active material or blend of active materials, according to some embodiments. Specifically, the tests shown in FIG. 7B were conducted at −10° C. and 0.33C. Similar trends are shown here with FIG. 7A, but overall capacity is less and nominal voltage is lower, since the test is conducted in 3 hour discharge condition (0.33 C). (Samples 1-4 in FIG. 7B are the same as samples 1-4 of FIGS. 5, 6, and 7A.)

Example 8: Discharge Rate

Figure 7C:
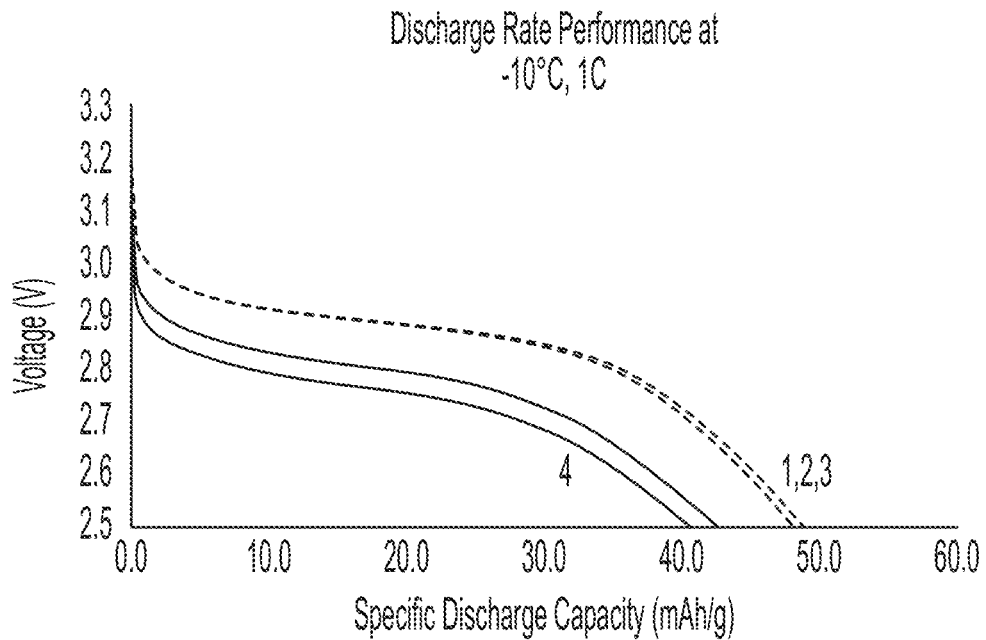
FIG. 7C is a graph showing various discharge rate performance for four different lithium-ion batteries using a full cell with graphite anode at low temperature (−10° C.) and higher C-rate (1 C, 1 hour discharge), each comprising a different active material or blend of active materials, according to some embodiments.

FIG. 7C is a graph showing various discharge rate performance for four different lithium-ion batteries, each comprising a different active material or blend of active materials, according to some embodiments. Specifically, the tests shown in FIG. 7C were conducted at −10° C. and 1C. As the C-rate goes higher, nominal voltage and capacity drops are more significant. (Samples 1-4 in FIG. 7C are the same as samples 1-4 of FIGS. 5, 6, 7A, and 7B)

Example 9: Discharge Rate

Figure 7D:
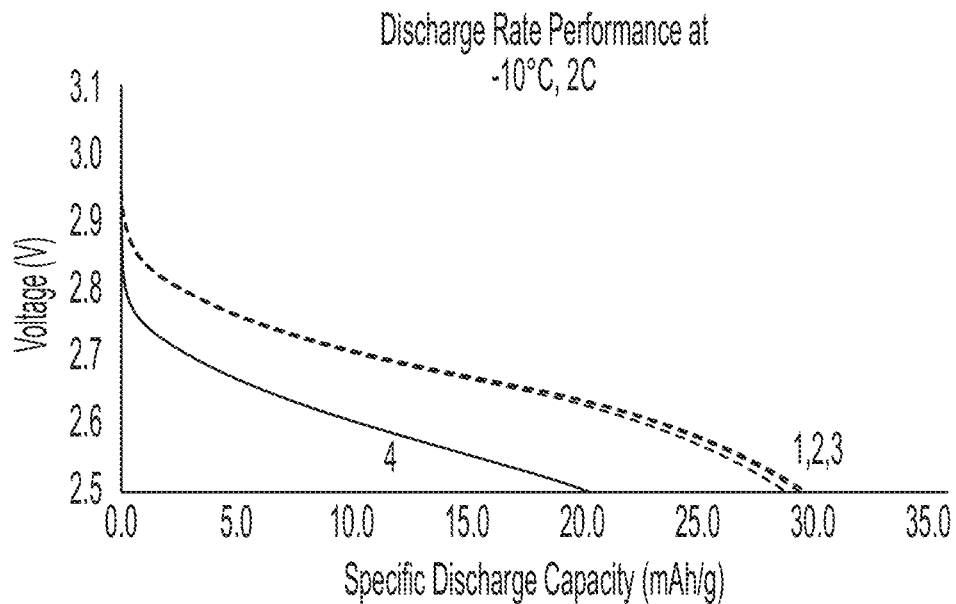
FIG. 7D is a graph showing various discharge rate performance for four different lithium-ion batteries using a full cell with graphite anode at low temperature (−10° C.) and higher C-rate (2 C, 30 minutes discharge), each comprising a different active material or blend of active materials, according to some embodiments.

FIG. 7D is a graph showing various discharge rate performance for four different lithium-ion batteries, each comprising a different active material or blend of active materials, according to some embodiments. Specifically, the tests shown in FIG. 7D were conducted at −10° C. and 2C. As the C-rate goes higher, nominal voltage and capacity drops are more significant. In the case of Sample 4, only 20 mAh/g (out of 170 mAh/g theoretical capacity) is being recovered. (Samples 1-4 in FIG. 7D are the same as samples 1-4 of FIGS. 5, 6, 7A, 7B, and 7C)

Battery Cells, Battery Modules, Battery Packs, and Electric Vehicle Systems

The blended active materials described above, and in particular, blended active materials comprising a first lithium metal phosphate material comprising primary particles and a second lithium metal phosphate material comprising secondary particles can be used in the fabrication of electrodes. More specifically, the blended active materials described herein may be used in the fabrication of cathodes that can be used to form battery cells, battery modules, and/or battery packs. Battery cells, battery modules, and/or battery packs comprising cathodes fabricated using the blended active materials described herein may then be used as a power source in electric vehicles. These embodiments are described in detail below.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the components, systems, methods, apparatuses, devices, compositions, etc. described herein can be implemented into the battery cells, battery modules, battery packs, and methods of making these battery cells, battery modules, and battery packs.

Figure 8:
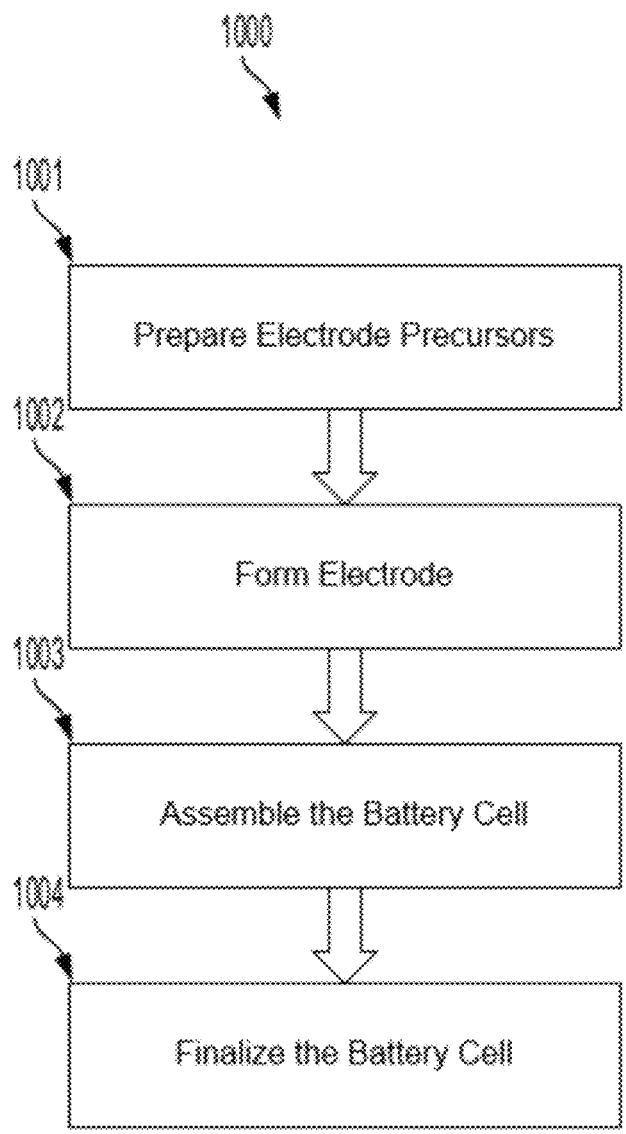
FIG. 8 illustrates a flow chart for a typical battery cell manufacturing process, according to some embodiments.

FIG. 8 illustrates a flow chart for a typical battery cell manufacturing process 1000. These steps are not exhaustive and other battery cell manufacturing processes can include additional steps or only a subset of these steps. At step 1001, the electrode precursors (e.g., binder, active material, conductive carbon additive) can be prepared. In some embodiments, this step can include mixing electrode materials (for example, active materials, and more specifically, the blended active materials described herein) with additional components (e.g., binders, solvents, conductive additives, etc.) to form an electrode slurry. In some embodiment, this step can include synthesizing the electrode materials themselves.

At step 1002, the electrode can be formed. In some embodiments, this step can include coating an electrode slurry (i.e., an electrode slurry comprising blended active materials according to embodiments described herein) on a current collector. After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

At step 1003, the battery cell can be assembled. After the electrodes, separators, and/or electrolytes have been prepared, a battery cell can be assembled/prepared. In this step, the separator and/or an electrolyte layer can be layered between the anode and cathode layers to form the internal structure of a battery cell. These layers can be layered by a winding method such as a round winding or prismatic/flat winding, a stacking method, or a z-folding method. The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 0.5 M.

In some embodiments, a solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride (LixPOyNz). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, Li10GeP2S12) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In some embodiments, the anode active materials can include graphitic carbon (e.g., ordered or disordered carbon with $sp^2$ hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

In addition to the cathode active materials (or even for anode active materials), the electrodes can include a conductive additive, commonly a conductive carbon material that can include graphite, carbon black, carbon nanotubes, Super P carbon black material, Ketjen Black, Acetylene Black, SWCNT, MWCNT, carbon nanofiber, graphene, and combinations thereof. In addition to the cathode active materials (or even for anode active materials), the electrodes can include binder materials to improve adhesion of the cathode (or anode) active materials to a current collector foil. In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), In various embodiments, electrode materials (for example, active materials, and more specifically, the blended active materials described herein) with additional components (e.g., binders, solvents, conductive additives, etc.) can be mixed with a solvent to form an electrode slurry.

Cathode active materials (or even for anode active materials) can include a carbon coating. Commonly lithium metal phosphates include a surface carbon coating for improving the conductivity of the active material. A carbon coating process can be performed during or subsequent to production of the lithium metal phosphate, for example pyrolysis of an organic substance on lithium metal phosphate particles at elevated temperature can produce active materials with carbon coatings and in some cases, secondary conductive phases in the active materials can be formed.

Cathode active materials can include a carbon coating, for example C-coating in of 0.5 to 3 wt. % or 0.8 to 1.6 wt. % of the active material. For example, 1 wt. % carbon coating material on 99 wt. % of lithium metal phosphate active material. This active material can then be mixed with carbon conductive additive (e.g., 3 wt. % conductive carbon additive with 97 wt. % active material) in the electrode slurry used to prepare the electrode.

Figure 9:
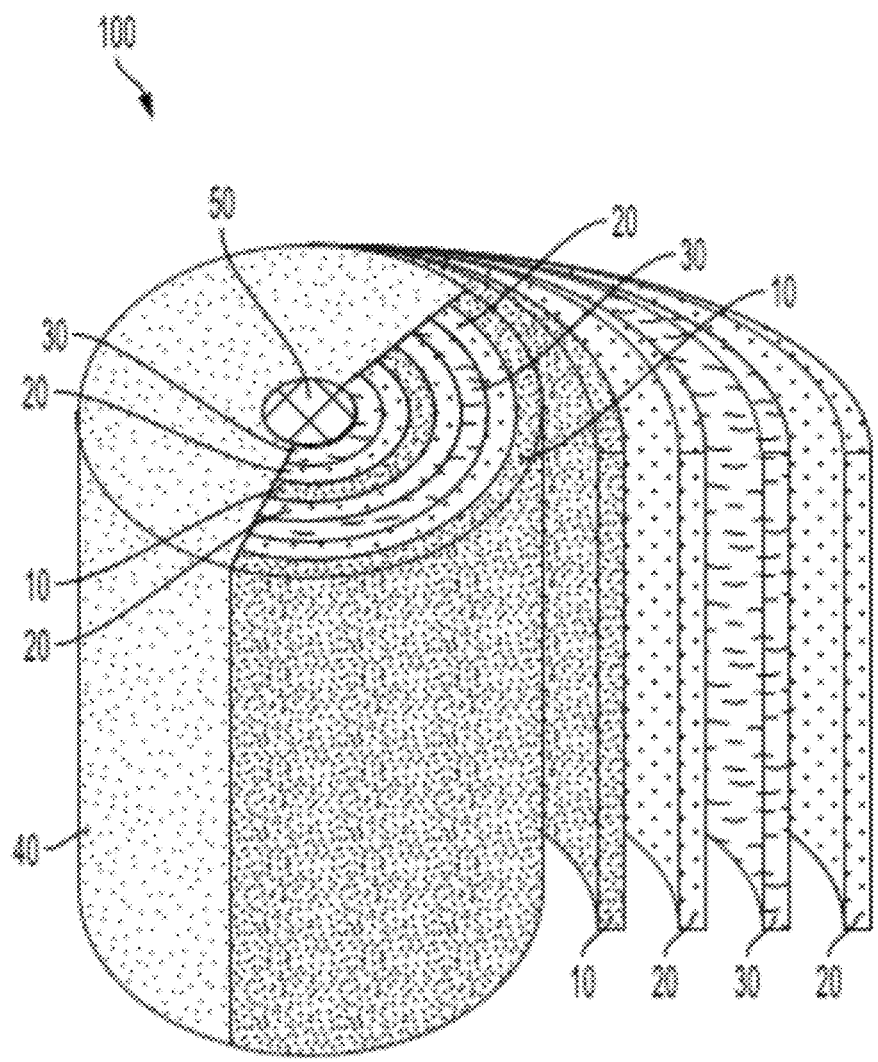
FIG. 9 depicts an illustrative example of a cross sectional view of a cylindrical battery cell, according to some embodiments.

FIG. 9 depicts an illustrative example of a cross sectional view of a cylindrical battery cell 100. The cylindrical battery cell can include layers (e.g., sheet-like layers) of anode layers 10, separator and/or electrolyte layers 20, and cathode layers 30.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, separator/electrolyte layers) can be sandwiched, rolled up, and/or packed into a cavity of a cylinder-shaped casing 40 (e.g., a metal can). The casings/housings can be rigid such as those made from metallic or hard-plastic, for example. In some embodiments, a separator layer (and/or electrolyte layer) 20 can be arranged between an anode layer 10 and a cathode layer 30 to separate the anode layer 20 and the cathode layer 30. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 20 can prevent contact between the anode and cathode layers while facilitating ion (e.g., lithium ions) transport in the cell. The battery cell can also include at least one terminal 50. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 10:
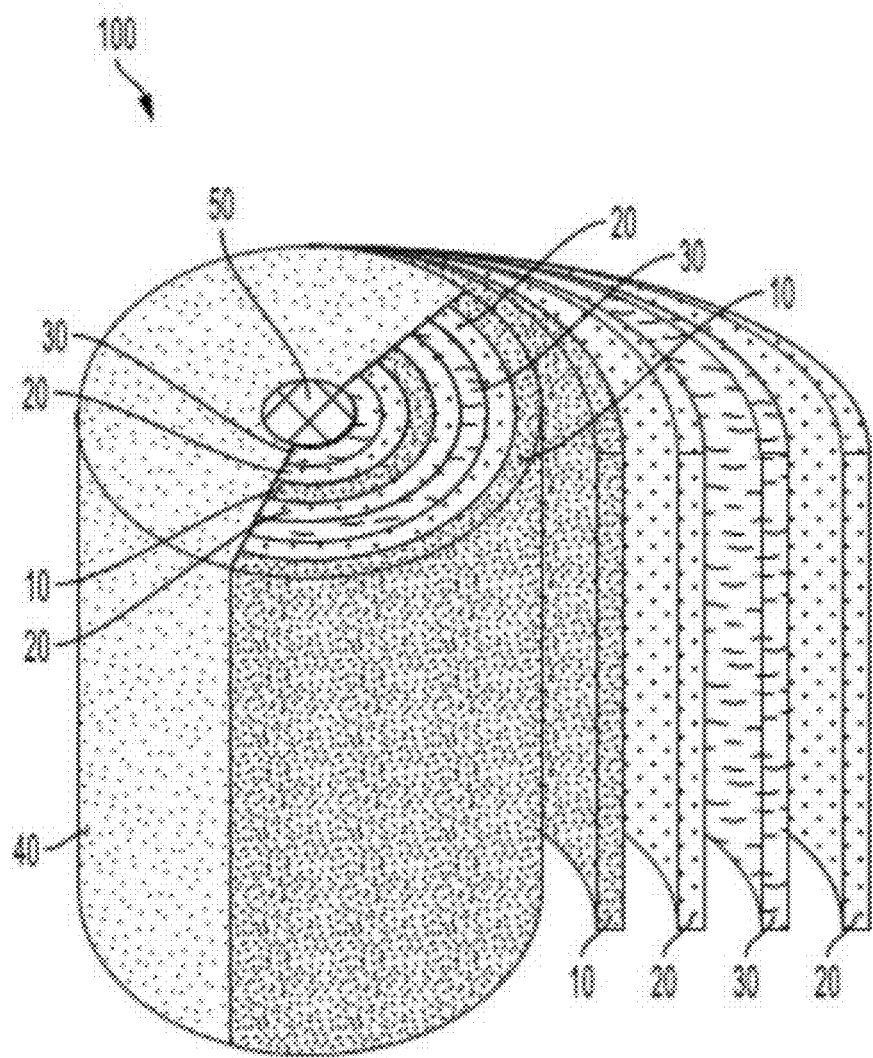
FIG. 10 depicts an illustrative example of a cross sectional view of a prismatic battery cell, according to some embodiments.

FIG. 10 depicts an illustrative example of a cross sectional view of a prismatic battery cell 200. The prismatic battery cell can include layers (e.g., sheet-like layers) of anode layers 10, separator and/or electrolyte layers 20, and cathode layers 30. Similar to the cylindrical battery cell, the layers of a prismatic battery cell can be sandwiched, rolled, and/or pressed to fit into cubic or rectangular cuboid (e.g., hyper-rectangle) shaped casing/housing 40. In some embodiments, the layers can be assembled by layer stacking rather than jelly rolling. In some embodiments, the casing or housing can be rigid such as those made from a metal and/or hard-plastic. In some embodiments, the prismatic battery cell 200 can include more than one terminal 50. In some embodiments, one of these terminals can be the positive terminal and the other a negative terminal. These terminals can be used to connect a load or charger to the battery cell.

Figure 11:
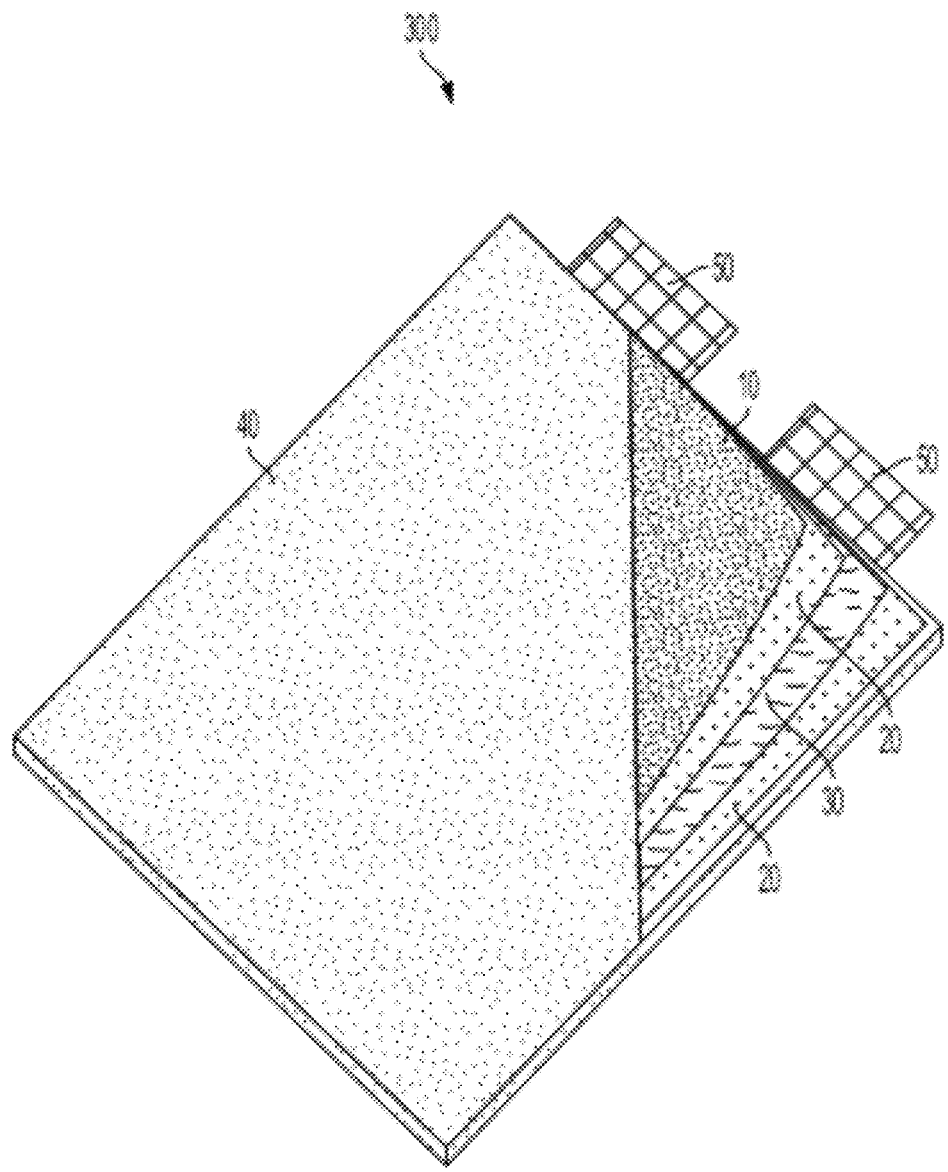
FIG. 11 depicts an illustrative example of a cross sectional view of a pouch battery cell, according to some embodiments.

FIG. 11 depicts an illustrative example of a cross section view of a pouch battery cell 300. The pouch battery cells do not have a rigid enclosure and instead use a flexible material for the casing/housing 40. This flexible material can be, for example, a sealed flexible foil. The pouch battery cell can include layers (e.g., sheet-like layers) of anode layers 10, separator and/or electrolyte layers 20, and cathode layers 30. In some embodiments, these layers are stacked in the casing/housing. In some embodiments, the pouch battery cell 200 can include more than one terminal 50. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 1004, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 12:
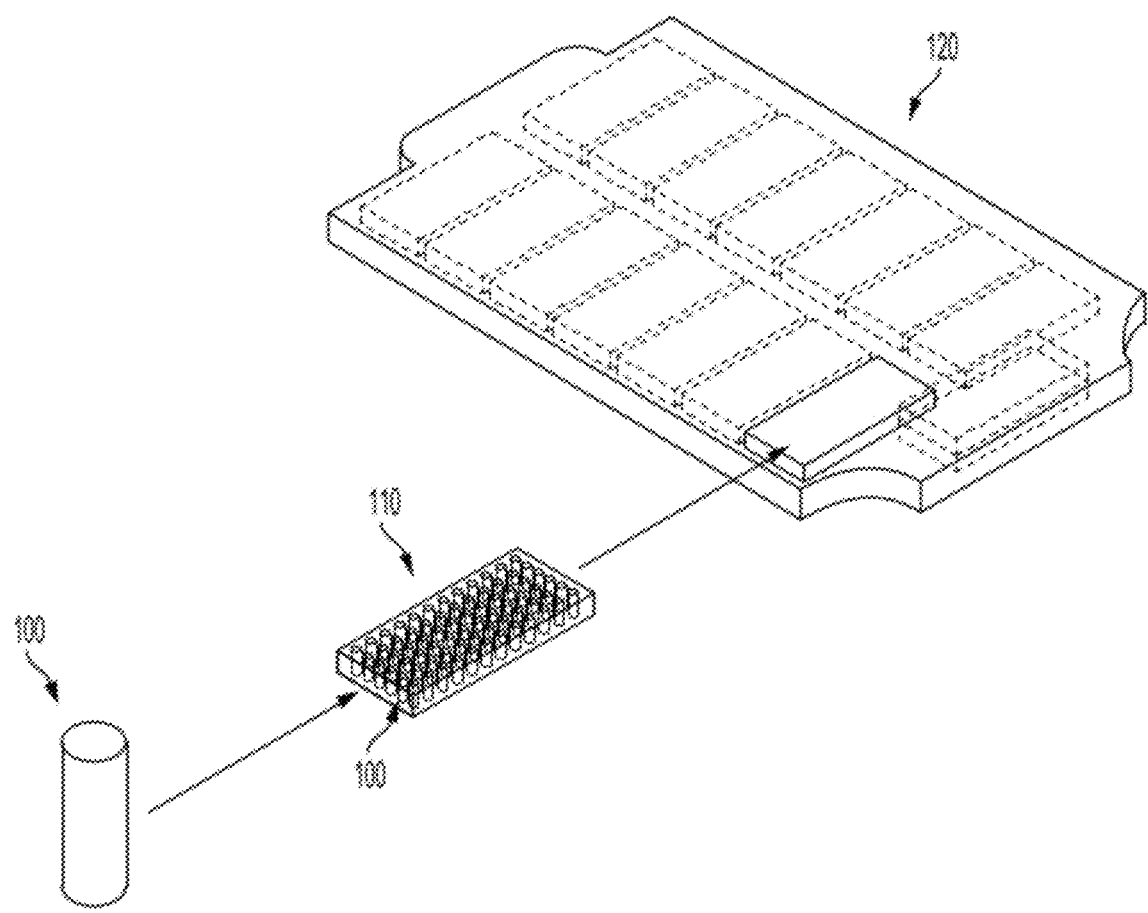
FIG. 12 illustrates cylindrical battery cells being inserted into a frame to form battery module and pack, according to some embodiments.
Figure 13:
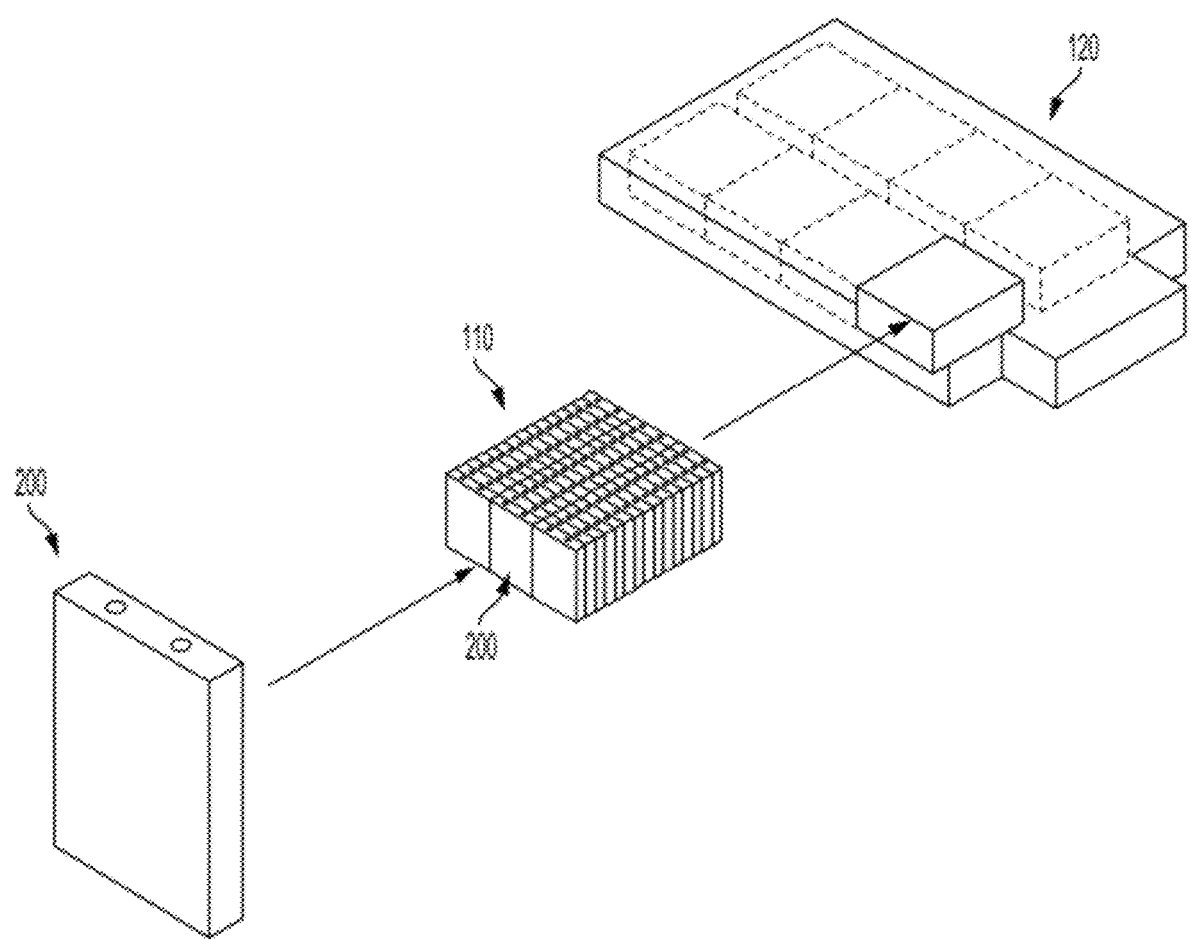
FIG. 13 illustrates prismatic battery cells being inserted into a frame to form battery module and pack, according to some embodiments.
Figure 14:
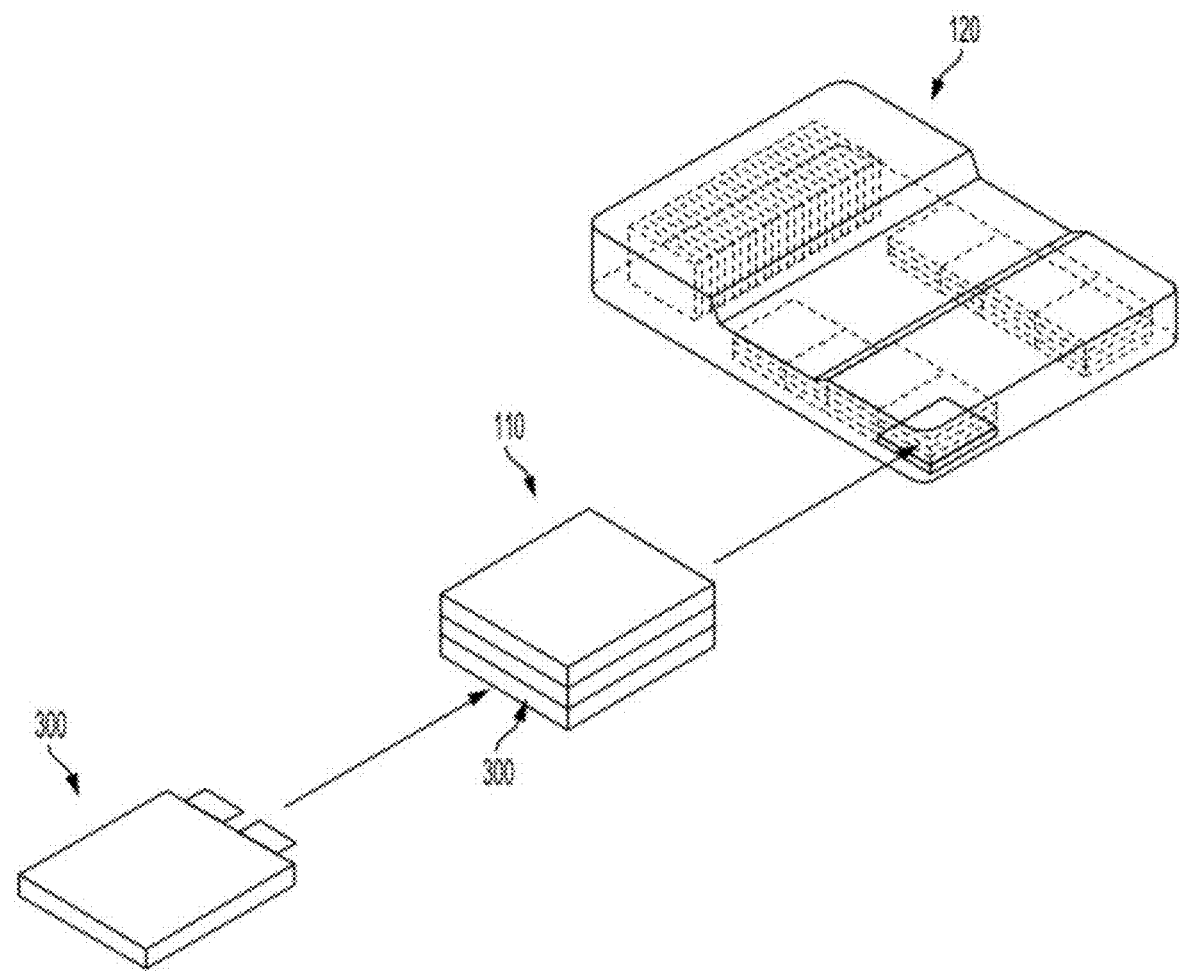
FIG. 14 illustrates pouch battery cells being inserted into a frame to form battery module and pack, according to some embodiments.

A plurality of battery cells (100, 200, and/or 300) can be assembled or packaged together in the same housing, frame, or casing to form a battery module and/or pack. The battery cells of a battery module can be electrically connected to generate an amount of electrical energy. These multiple battery cells can be linked to the outside of the housing, frame, or casing, through a uniform boundary. The battery cells of the battery module can be in parallel, series, or a series-parallel combination of battery cells. The housing, frame, or casing can protect the battery cells from a variety of dangers (e.g., external elements, heat, vibration, etc.). FIG. 12 illustrates cylindrical battery cells 100 being inserted into a frame to form battery module 110. FIG. 13 illustrates prismatic battery cells 200 being inserted into a frame to form battery module 110. FIG. 14 illustrates pouch battery cells 300 being inserted into a frame to form battery module 110. In some embodiments, the battery pack may not include modules. For example, the battery pack can have a "module-free" or cell-to-pack configuration wherein battery cells are arranged directly into a battery pack without assembly into a module.

A plurality of the battery modules 110 can be disposed within another housing, frame, or casing to form a battery pack 120 as shown in FIGS. 12-14. In some embodiments, a plurality of battery cells can be assembled, packed, disposed within a housing, frame, or casing to form a battery pack (not shown). In such embodiments, the battery pack may not include a battery module (e.g., module-free). For example, the battery pack can have a cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 12-14 illustrates three differently shaped battery packs 120. As shown in FIGS. 12-14, the battery packs 120 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 15:
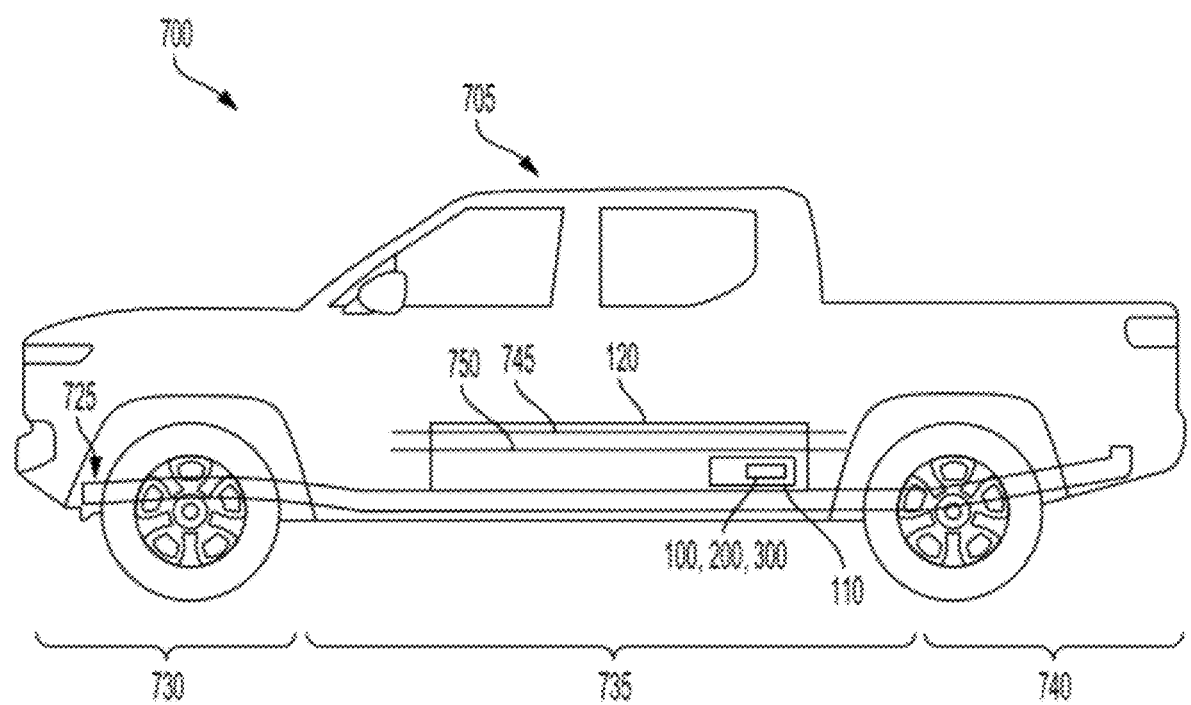
FIG. 15 illustrates an example of a cross sectional view of an electric vehicle that includes at least one battery pack, according to some embodiments.

FIG. 15 illustrates an example of a cross sectional view 700 of an electric vehicle 705 that includes at least one battery pack 120. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 705 can be installed with a battery pack 120 that includes battery modules 110 (or in other embodiments, without arrangement into modules) with battery cells (100, 200, and/or 300) to power the electric vehicles. The electric vehicle 705 can include a chassis 725 (e.g., a frame, internal frame, or support structure). The chassis 725 can support various components of the electric vehicle 705. In some embodiments, the chassis 725 can span a front portion 730 (e.g., a hood or bonnet portion), a body portion 735, and a rear portion 740 (e.g., a trunk, payload, or boot portion) of the electric vehicle 705. The battery pack 120 can be installed or placed within the electric vehicle 705. For example, the battery pack 120 can be installed on the chassis 725 of the electric vehicle 705 within one or more of the front portion 730, the body portion 735, or the rear portion 740. In some embodiments, the battery pack 120 can include or connect with at least one busbar, e.g., a current collector element. For example, the first busbar 745 and the second busbar 750 can include electrically conductive material to connect or otherwise electrically couple the battery pack 120 (and/or battery modules 110 or the battery cells 100, 200, and/or 300) with other electrical components of the electric vehicle 705 to provide electrical power to various systems or components of the electric vehicle 705. In some embodiments, battery pack 120 can also be used as an energy storage system to power a building, such as a residential home or commercial building instead of or in addition to an electric vehicle.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. An electrode for a lithium-ion battery comprising a blend of:
   a first lithium metal phosphate material comprising a first plurality of primary active material particles having a D50 of from 150 nanometers to 2 microns; and
   a second lithium metal phosphate material comprising a second plurality of primary active material particles having a D50 of from 5 to 300 times larger than the first plurality of primary active material particles,
   wherein the first lithium metal phosphate material and the second lithium metal phosphate material are independently represented by formula $LiMPO_4$, wherein M is one or more of iron (Fe) or manganese (Mn), and wherein the first lithium metal phosphate material is blended with the second lithium metal phosphate material at a weight ratio of greater than 1:1.

2. The electrode of claim 1, wherein the second plurality of primary active material particles have a D50 of from 5 to 50 times larger than the first plurality of primary active material particles.

3. The electrode of claim 1, wherein the D50 of the first plurality of primary active material particles is from 150 nm to 1 microns.

4. The electrode of claim 1, wherein the D50 of the first plurality of primary active material particles is from 150 nm to 500 nm.

5. The electrode of claim 1, wherein M for the first lithium metal phosphate material and the second lithium metal phosphate material is iron (Fe).

6. The electrode of claim 1, wherein the first and second lithium metal phosphate materials are the same $LiMPO_4$.

7. The electrode of claim 2, wherein the D50 of the first plurality of primary active material particles is from 300 nanometers to 2 microns.

8. The electrode of claim 1, wherein the second plurality of primary active material particles have a D50 of from 5 to 25 times larger than the first plurality of primary active material particles.

9. The electrode of claim 1, wherein the blend comprises from 0.5 to 3 wt. % carbon.

10. The electrode of claim 1, wherein the blend has a resistivity of less than or equal to 600 ohm-cm.

11. The electrode of claim 1, wherein the blend has a tap density of greater than or equal to 0.8 g/cc.

12. The electrode of claim 1, wherein the first lithium metal phosphate material is blended with the second lithium metal phosphate material at a weight ratio of greater than 3:2.

13. The electrode of claim 1, wherein the first lithium metal phosphate material is blended with the second lithium metal phosphate material at a weight ratio of greater than 3:1.

14. The electrode of claim 1, wherein the electrode has an electrode press density from 1.8 to 2.8 g/cc.

15. The electrode of claim 2, wherein a surface area of the first plurality of primary active material particles is less than or equal to 15 $m^2/g$.

16. The electrode of claim 2, wherein the D50 of the first plurality of primary active material particles is from 150 nm to 500 nm.

17. The electrode of claim 2, wherein the D50 of the first plurality of primary active material particles is from 150 nm to 1 microns.

18. A rechargeable lithium-ion battery comprising:
an electrode comprising a blend of:
    a first lithium metal phosphate material comprising a first plurality of primary active material particles having a D50 of from 150 nanometers to 2 microns; and
    a second lithium metal phosphate material comprising a second plurality of primary active material particles having a D50 of from 5 to 300 times larger than the first plurality of primary active material particles,
    wherein the first lithium metal phosphate material and the second lithium metal phosphate material are independently represented by formula $LiMPO_4$, wherein M is one or more of iron (Fe) or manganese (Mn), and
    wherein the first lithium metal phosphate material is blended with the second lithium metal phosphate material at a weight ratio of greater than 1:1.

19. An electric vehicle system comprising the rechargeable lithium-ion battery of claim 18.

20. The rechargeable lithium-ion battery claim 18, wherein the second plurality of primary active material particles have a D50 of from 5 to 50 times larger than the first plurality of primary active material particles.

* * * * *